United States Patent [19]
Wolkstein

[11] Patent Number: 5,287,543
[45] Date of Patent: Feb. 15, 1994

[54] MULTICHANNEL COMMUNICATION SYSTEM WITH AN AMPLIFIER IN EACH CHANNEL

[75] Inventor: Herbert J. Wolkstein, Livingston, N.J.

[73] Assignee: General Electric Co., East Windsor, N.J.

[21] Appl. No.: 772,207

[22] Filed: Oct. 7, 1991

[51] Int. Cl.$^5$ .............................................. H04B 7/185
[52] U.S. Cl. ........................................ 455/13.3; 455/8; 455/20; 455/103; 330/124 R; 342/354
[58] Field of Search ................ 455/8, 12.1, 13.3, 13.4, 455/20, 101, 103; 342/353, 354; 370/75; 333/105; 330/124 R, 124 D, 126

[56] References Cited

U.S. PATENT DOCUMENTS

| | | | |
|---|---|---|---|
| 4,070,637 | 1/1978 | Assal et al. | 333/105 |
| 4,831,619 | 6/1989 | Rosen | 455/13.3 |
| 4,868,886 | 9/1989 | Assal et al. | 455/13.3 |
| 4,901,085 | 2/1990 | Spring et al. | 455/13.3 |

Primary Examiner—Reinhard J. Eisenzopf
Assistant Examiner—Chi Pham
Attorney, Agent, or Firm—W. H. Meise; C. A. Berard; S. A. Young

[57] ABSTRACT

A multichannel communication system carries signals having a different frequency range in each channel. In order to achieve a particular output power level from each channel, an amplifier is associated with each channel to boost the signal level. For reliability, a switching arrangement switches amplifiers among the channels in accordance with a priority, or substitutes a redundant amplifier for a degraded or failed unit in a channel. The amplifier is subject to distortion at the desired output level, and is cascaded with a distortion equalizer or linearizer for reducing the total distortion. In accordance with the invention, each distortion equalizer is fixedly connected in one channel, and is optimized for the relatively narrow frequency range of that channel, rather than being switched together with the amplifier and being optimized over the total or cumulative bandwidth of all the channels.

10 Claims, 3 Drawing Sheets

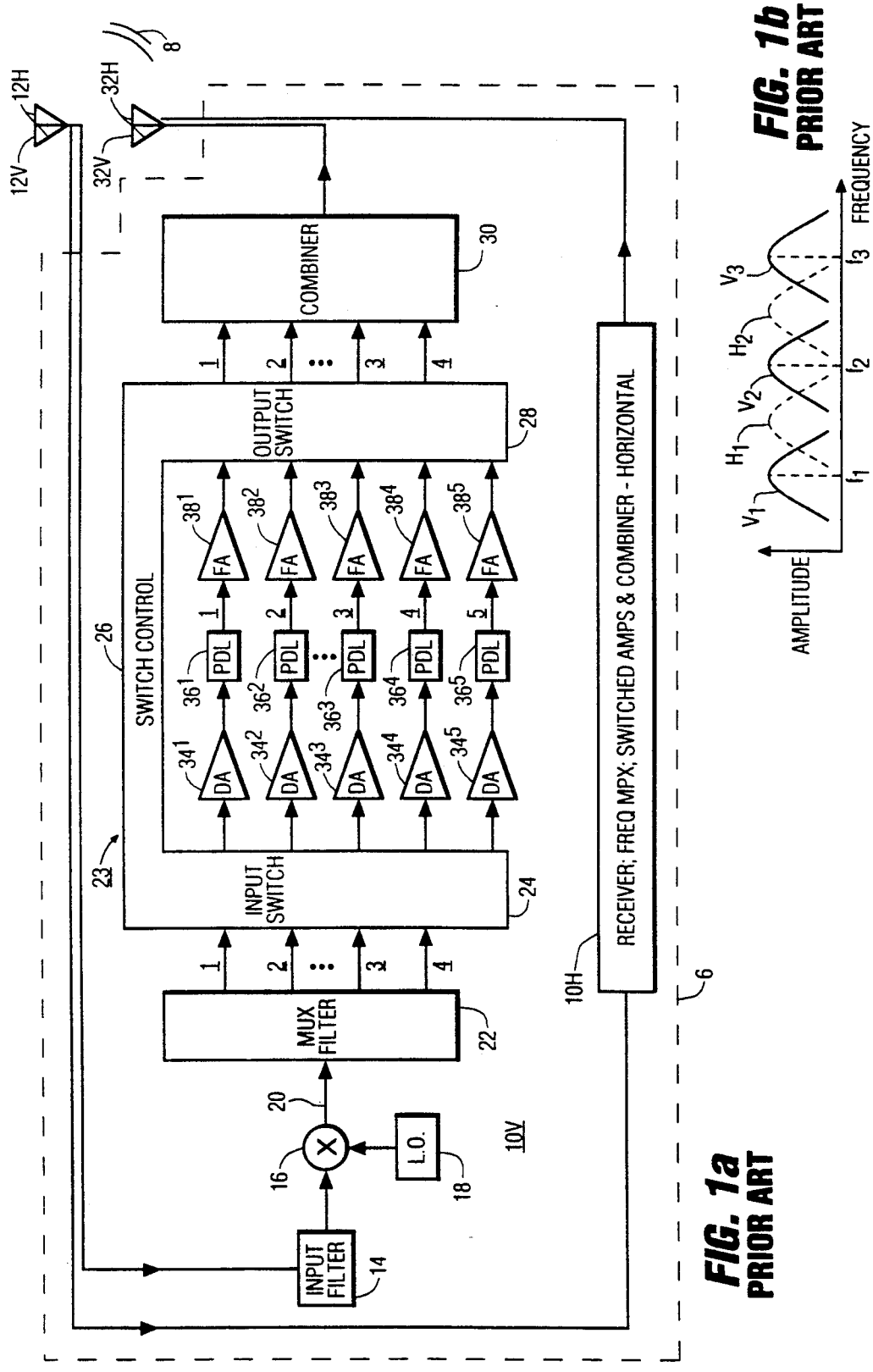

MULTICHANNEL COMMUNICATION SYSTEM WITH AN AMPLIFIER IN EACH CHANNEL

BACKGROUND OF THE INVENTION

This invention relates to multichannel communication systems including power amplifiers, and more particularly to distortion correction in a multichannel system.

Modern communication satellites provide several broadband repeater channels, which receive from an Earth station a plurality of signals within a cumulative frequency band, process the received signals, as by low-noise amplification, filtration and block conversion to another frequency, for retransmission to the same or another location. While the description of the invention is couched in terms of a communications satellite, the invention may also be used for terrestrial or other uses.

FIG. 1a illustrates, in simplified block diagram form, a satellite body 6 in accordance with the prior art, upon which are mounted a polarizing grid arrangement 8, vertically polarized receiving antenna 12V and horizontally polarized receiving antenna 12H. Receiving antennas 12V and 12H are coupled to vertical and horizontal signal processing arrangements 10V and 10H, respectively, located within body 6. Signal processing arrangements 10V and 10H process the received signals to produce signals to be retransmitted, which are broadcast by transmitting antennas 32V and 32H, respectively. Signal processing arrangement 10H is similar to vertical processing unit 10V, so only processing unit 10V is described.

The nature of the signals arriving at the satellite may be understood by reference to FIG. 1b. The vertically-polarized signals arriving at antenna 12V by way of polarizing grid 8 includes a plurality of signals centered at different frequencies f1, f2, f3. The amplitude spectra of various signals are designated V1, V2, V3 in FIG. 1b. Some of the signals arriving with horizontal polarization (at antenna 12H) are illustrated (in dashed lines) as H1, H2 in FIG. 1b. In a typical satellite system, there may be as many as 10 or more vertical (V) and 10 or more horizontal (H) channels, with their frequencies of operation interleaved as shown in FIG. 1b. The bandwidth of a signal such as signal V2 may be sufficient to carry a television channel, or more. Thus, the bandwidth of a signal such as V2 may be 6 MHz or more. Vertical processing channel 10V of FIG. 1a may, as a consequence, receive 10 or more signals V1, V2, V3 . . . $V_N$, each six or more MHz wide, which are separated from each other by a like amount. Thus, the total frequency bandwidth occupied by the vertical signals may be 120 MHz or more, calculated as $[10(v)+10(H)]\times 6$. The center frequency of the 120 MHz band may be, for example, at 14 GHz.

The 10 or more vertical signals V1, V2 . . . received by antenna 12V of FIG. 1a are coupled to an input filter 14 of channel 10V, for reducing noise and preventing interference. Filter 14 is a bandpass filter with a bandwidth substantially equal to the total bandwidth of the vertical signals. The filtered signals are coupled from input filter 14 to a low noise amplifier (not illustrated) if required, and then to a block converter including a mixer 16 and a local oscillator 18. The frequency of local oscillator 18 is selected to convert the 14 GHz center frequency to some other center frequency, such as 12 GHz. The downconverted 12 GHz signals are applied over a transmission path 20 to a multiplexing (MUX) filter 22. Multiplexing filter 22 separates signals V1, V2, V3 . . . from each other in accordance with their frequencies. Multiplexing filter 22 is the starting point for a plurality of separate channels designated generally as 1, 2, . . . 3, 4. If there are 10 vertical signals V1, V2, V3 . . . , then the number of channels in signal processor 10V is also 10. The signal in each of channels 1, 2, . . . 3, 4 is one of the signals V1, V2, . . . . In effect, filter 22 is a source of signals at a plurality of different frequencies, driving a like plurality of separate channels.

In general, the signals on channels 1, 2, . . . 3, 4 in FIG. 1a are amplified, the distortion generated due to the amplification is compensated, and the amplified and distortion corrected signals are applied to a combiner or demultiplexer 30, which may be a filter similar to filter 22 operated in reverse, or it might be a group of hybrid combiners which do not discriminate based upon frequency. The combined signals at the output of combiner 30 are applied to a transmitting antenna 32V for transmission back to an Earth station, or possibly to another satellite.

System considerations such as the signal strength of the signal available at the satellite, the receiving antenna gain, and the transmitting antenna gain and field strength required to reach the ground station establish the overall power gain which must be provided in each channel between receiving antenna 12V and transmitting antenna 32V.

Within any channel 1, 2, . . . 3, 4 of FIG. 1a, the signal is processed by the cascade of a driver amplifier (DA) 34, a distortion linearizer such as a predistortion equalizer (PDL) 36, and a power amplifier or final amplifier (FA) 38. For example, as illustrated in FIG. 1a, the cascade of a DA $34^1$, PDL $36^1$ and FA $38^1$ processes the channel 1 signals, and a DA $34^2$, PDL $36^2$, and FA $38^2$ amplifies the signals for channel 2. As illustrated in FIG. 1a, an additional cascade of a DA $34^5$, PDL $36^5$, and FA $38^5$ is connected in cascade, to define a supernumerary "channel" designated 5. Channel 5 is not connected for handling signal, but instead represents a reserve cascade which may be substituted into any of the other channels in which the cascade may become defective. To this end, connection between input filter 22 and the inputs of the various channel cascades 34, 36, 38 is provided by means of an input switch arrangement designated 24, and connection between the outputs of final amplifiers 38 and combiner 30 is provided by an output switch arrangement designated as 28. A switch control arrangement illustrated as 26 gangs the input and output switches for simultaneous operation, and responds to signals in response to evidence of failure, generated on the ground or autonomously by control circuits within the spacecraft itself. Thus, in the event that the cascade of DA $34^1$, PDL $36^11$, and FA $38^1$ fails completely or becomes degraded, the reserve cascade including DA $34^5$, PDL $36^5$, and FA $38^5$ can be substituted therefor, with the cascade of DA $34^1$, PDL $36^1$, and FA $38^1$ being removed from on-line use. Naturally, additional redundant units may be provided, and if the number of failures should exceed the number of redundant units, the switching arrangement including 24, 26 and 28 may move operable cascades from lower-priority uses to higher-priority uses. In order to be switchable to obtain this level of reliability, each cascade must have an instantaneous frequency bandwidth covering the cumulative or total bandwidth of the vertical signals V1, V2, V3, . . . .

An improved communications system is desired.

SUMMARY OF THE INVENTION

Recognizing that broadband final amplifiers of the solid-state type, and even those using modern traveling-wave tubes (TWTs), have very similar distortion characteristics among themselves, the switching arrangement is repositioned so that the distortion equalizers are fixedly associated with the individual channel, rather than being switchable together with the amplifier. As a result, the distortion equalizer may be designed and optimized during manufacture for the relatively narrow bandwidth of the channel, rather than for the total bandwidth of all the channels.

DESCRIPTION OF THE DRAWING

FIGS. 1a and 1b is a simplified block diagram of a prior art spacecraft communication systems, and FIG. 1b illustrates a simplified portion of an amplitude-frequency spectrum associated with the arrangement of FIG. 1a;

FIG. 2b is a portion thereof.

DESCRIPTION OF THE INVENTION

Figure 2A:
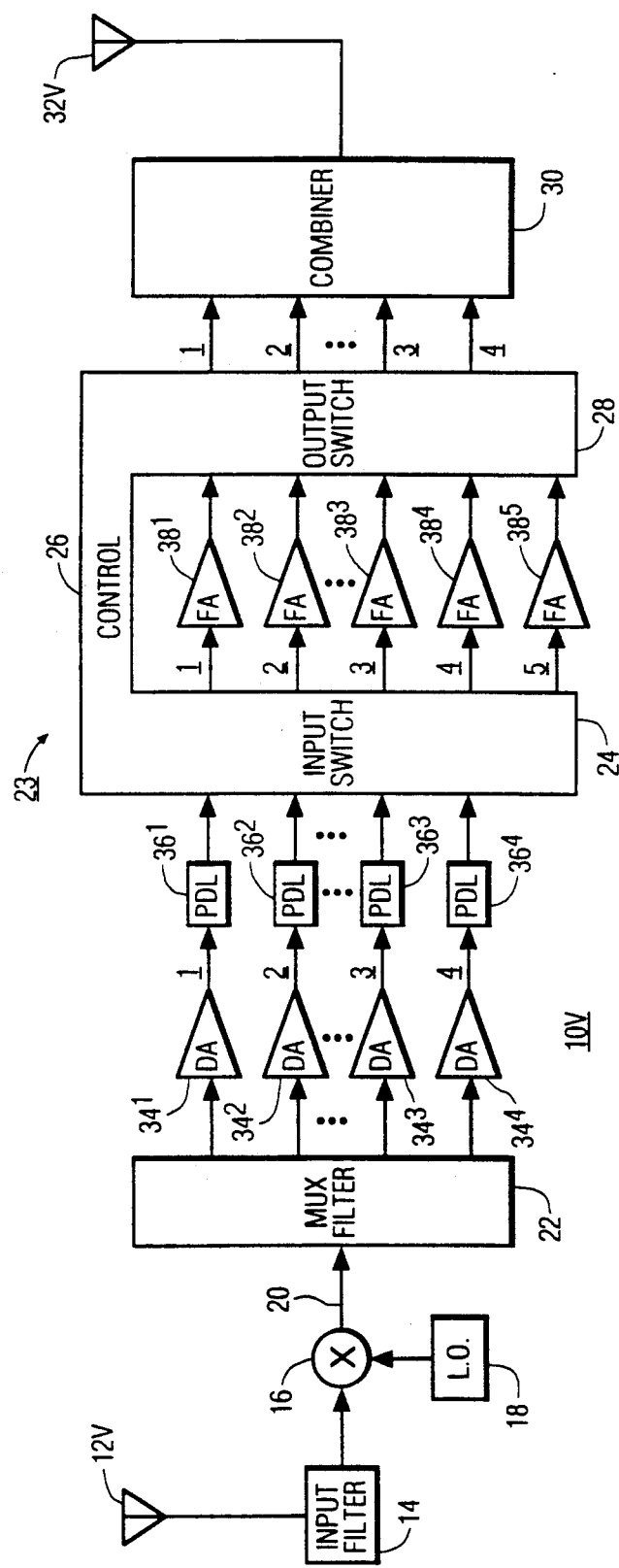
FIGS. 2a and 2b is a simplified block diagram which illustrates a portion of a spacecraft communication system in accordance with the invention.

FIG. 2a is a simplified block diagram of a portion of a spacecraft communication system in accordance with the invention. Elements of FIG. 2a corresponding to those of FIG. 1a are designated by the same reference numerals. In FIG. 2, each cascade of a driver amplifier 34, predistortion equalizer 36, and final amplifier 38 is redistributed so that the driver amplifier and predistortion limiter are fixedly associated with each channel, between the multiplexing filter 22 (the effective input of the channel) and the input of switching arrangement 24. Thus, driver amplifier $34_1$ and predistortion linearizer $36_1$ are cascaded between the channel 1 output of multiplexing filter 22 and input switch 24. As illustrated in FIG. 2a, switch arrangement 23 connects final amplifier $38_1$ in channel 1. The net gain in channel 1 between the channel 1 output of multiplex filter 22 and the channel 1 input of combiner 30 is identically the same as in the arrangement of FIG. 1a (assuming, of course, that the elements themselves are identical). Similarly, the gains through each of the channels of FIG. 2a are the same as in FIG. 1a. However, only the final amplifiers 38 are required to have the cumulative bandwidth of all the vertical-polarization channels, if the redundancy scheme so requires, while the driver amplifiers and predistortion linearizers require only the relatively narrow channel bandwidth. For the previous example of 10 vertical channels, each with 6 MHz bandwidth, the driver amplifiers and predistortion linearizers are required to have only a 6 MHz bandwidth in the arrangement of FIG. 2a, compared with a bandwidth of 120 MHz in the prior art arrangement of FIG. 1a. It should be noted that the block conversion reduces the center frequency but not the cumulative bandwidth, so the percent bandwidth is increased by the block conversion.

Figure 2B:
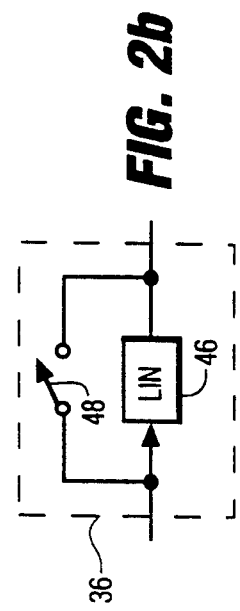

FIG. 2b is a simplified block diagram of a portion of the arrangement of FIG. 2a. In particular, predistortion linearizer 36 may include a linearizer 46, which may be a conventional linearizer such as is described in U.S. Pat. No. 5,015,965 issued May 14, 1991 in the name of Katz, et al. Any other conventional linearizer can be used. As illustrated in FIG. 2b, linearizer 46 is bypassed by a controllable switch 48. Those skilled in the art realize that while switch 48 is illustrated by a mechanical switch symbol, switches adapted for GHz frequency ranges must be used and may be electronic rather than mechanical in nature. Further, in order to avoid impedance perturbations, a switch such as 48 bypassing linearizer 46 may also include other switch portions intended for disconnecting linearizer 46 from the line when bypass switch 48 is closed.

Figure 3:
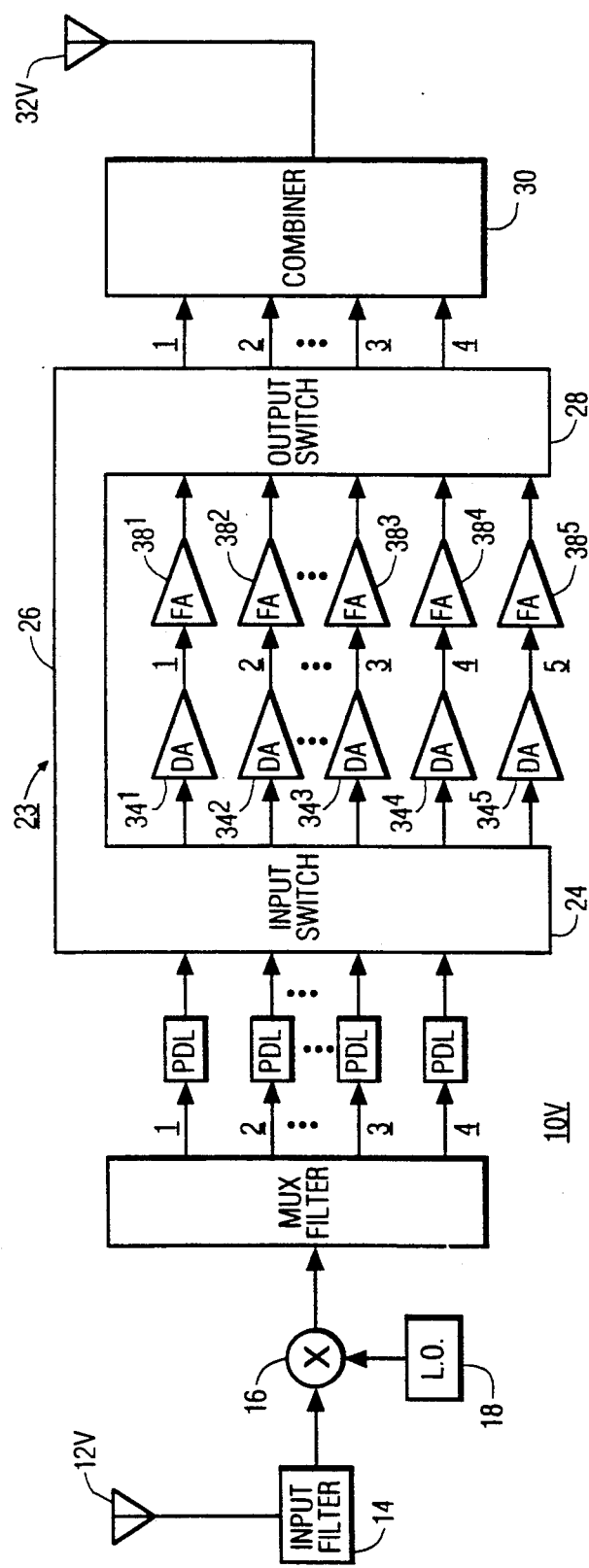
FIG. 3 illustrates a portion of a spacecraft communication system according to another aspect of the invention.

FIG. 3 illustrates another possible arrangement according to the invention. In FIG. 3, the cascade of a driver amplifier 34 and final amplifier 38 is switched among channels by switch arrangement 23, on the theory that the amplifiers are more likely to fail than the linearizer. This has the disadvantage that each driver amplifier 34 must have a bandwidth equal to the cumulative bandwidth of the V signals, but since each driver amplifier operates at lower signal amplitude levels, the bandwidth is achieved more readily than in the final amplifiers. Another possible disadvantage is that the various predistortion equalizers operate at signal levels which are less than in the arrangement of FIG. 2a by the gain of the driver amplifier 34. If the driver amplifiers have 20 dB of gain, the power level at which each PDL 36 operates is also reduced by 20 dB compared with FIG. 2a. Many of the components of a linearizer, such as diodes, may exhibit less control range at the lower signal levels.

Other embodiments of the invention will be apparent to those skilled in the art. In particular, each linearizer 36 may be made redundant, so that in the event that a linearizer fails, a corresponding one (similarly optimized for frequency response in the channel) can be substituted therefor. Also, post-distortion linearizers may be used in the same fashion, by connecting the post-distortion linearizer in a particular channel, as for example channel 1, between output switch 28 and combiner 30. A satellite may include more than one system such as that described, for example one system receiving at 14 GHz and retransmitting at 12 GHz, with another system receiving at 6 GHz and retransmitting at 4 GHz. AGC or limiter amplifiers may be used as desired. While a system has been described in which the nonlinearity arises from a travelling-wave tube, the invention may be used with any broadband nonlinear apparatus operating in a narrowband-channel context, and particularly with solid state power amplifiers.

What is claimed is:

1. A multichannel amplifying arrangement including a multiplicity of channels, said arrangement comprising:
   a plurality N of sources of signal, each of said sources of signal being operative at a different frequency range, said different frequency ranges cumulatively covering a predetermined total bandwidth, each of said sources of signal being coupled to the input of one of said channels;
   a plurality of at least N power amplifiers, each including an input port and an output port, and each for amplifying signal applied to said input port and for generating amplified signal at said output port, each of said power amplifiers having a bandwidth substantially equal to said total bandwidth, and each of said power amplifiers being subject to nonlinearities at certain operating levels;

utilization means coupled to an output port of each of said channels for using amplified signal therefrom;

controllably switchable interconnection means coupled to said input and output ports of each of said plurality of power amplifiers, and by way of said channels to said N sources and to said utilization means, for coupling each of said power amplifiers in one of said channels, with any of said plurality of power amplifiers which are in excess of the number of active channels being held in reserve, and in case of degradation of one of said power amplifiers associated with a particular channel, for selectively switching said degraded power amplifier out of said particular channel, and for switching into said particular channel an operational one of said power amplifiers, the bandwidth of which includes the frequency range of said particular channel, whereby said operational one of said power amplifiers amplifies signals in said particular channel; and a plurality N of linearization means adapted for compensating said nonlinearities, each of said linearization means being fixedly associated with one of said channels and switchably associated with that one of said power amplifiers coupled by said switchable interconnection means in said one of said channels, whereby each of said linearization means must have a bandwidth sufficient to cover only one of said frequency ranges, and not said total bandwidth.

2. An arrangement according to claim 1, wherein said N sources comprise:
antenna means for simultaneously receiving a plurality of said signals, each in one of said different frequency ranges, and for coupling said signals to a single transmission path; and
frequency separation filter means including an input port coupled to said transmission path, and also including a plurality of output ports, for frequency separating said signals into said plurality of channels.

3. An arrangement according to claim 2, further comprising frequency conversion means coupled in said transmission path, between said antenna means and said input port of said frequency separation filter means, for converting each of said signals received by said antenna means to another frequency.

4. An arrangement according to claim 1, wherein each of said power amplifiers comprises a travelling-wave tube.

5. An arrangement according to claim 1, wherein each of said linearization means comprises a predistortion equalizer; and
each of said predistortion equalizers is coupled in one of said channels at a location between the corresponding one of said sources and the associated portion of said switchable interconnection means.

6. A spacecraft comprising:
a polarized receiving antenna for receiving N signals over a first frequency range in a first polarization to produce received signals;
a frequency converter coupled to said antenna for converting said received signals to a second frequency range, within which second frequency range each of said signals exclusively occupies a predetermined portion;
a frequency separation filter coupled to said frequency converter, for separating said signals from each other depending upon which portion of said second frequency range said signal occupies, to thereby separate said signals into N separate channels;
a transmitting antenna;
a signal combiner coupled to an output of each of said channels and to said transmitting antenna for combining signals received from each of said channels to produce a combined signal, and for coupling said combined signal to said transmitting antenna for transmission;
a plurality at least equal to N of amplifiers, each of said amplifiers including an input port for receiving one of said signals and an output port at which amplified signal is produced, each of said amplifiers being subject to nonlinearities which depend upon signal level;
a switching arrangement coupled to each of said N channels, and also coupled to said input and output ports of said amplifiers, for coupling one of said amplifiers into each of said channels, and for, in any of said channels, replacing that one of said amplifiers currently in-circuit with another one of said amplifiers; and
a plurality N of distortion correctors, each of said distortion correctors being fixedly coupled in one of said channels, for correcting the distortion of that one of said amplifiers currently operating in said one of said channels.

7. A spacecraft according to claim 6, wherein each of said distortion correctors comprises a predistortion correction means, each including an input port and an output port, said input ports of each of said predistortion correction means being fixedly coupled to a different output of said frequency separation filter, and said output ports of each of said predistortion correction means being coupled by way of a portion of said switching arrangement to said input port of one of said amplifiers.

8. A spacecraft according to claim 7, further comprising a plurality of driver amplifiers, each of said driver amplifiers being fixedly coupled in one of said channels between one of said outputs of said frequency separation filter and the associated one of said predistortion correction means.

9. A method for operating a spacecraft communication system, comprising the steps of:
receiving a plurality of transmitted information signals to be retransmitted;
converting the carrier frequency of said information signals to produce converted signals;
separating said converted signals, in accordance with frequency, into a plurality of separated signals, each in a different channel, each channel having a different channel bandwidth, the cumulative channel bandwidth defining a total bandwidth greater than that of any one of said channel bandwidths;
combining the signals at the outputs of said channels to produce a combined output signal;
applying said combined output signal to a transmitting antenna for retransmission;
within at least one of said channels, switchably coupling, for operation within said one of said channels, an operable power amplifier having at least said total bandwidth, for amplification of said separated signal in said one of said channels, for producing an amplified signal subject to nonlinearity at some operating levels;

within at least said one of said channels, correcting said nonlinearity by means of a linearizer dedicated to said channel and not to any one of said amplifiers.

10. A method according to claim 9, wherein said step of correcting said nonlinearity includes the step of predistortion each of said separated signals before said amplification.

* * * * *